(12) United States Patent
Reuter et al.

(10) Patent No.: US 9,273,685 B2
(45) Date of Patent: Mar. 1, 2016

(54) HIGH PERFORMANCE ELECTRONIC STABILITY CONTROL PUMP ASSEMBLY

(75) Inventors: David F. Reuter, Beavercreek, OH (US);
Adam M. Osswald, Eaton, OH (US);
Jay P. Johnson, Franklin, OH (US)

(73) Assignee: BeijingWest Industries Co., Ltd., Beijing (CN)

(*) Notice: Subject to any disclaimer, the term of this patent is extended or adjusted under 35 U.S.C. 154(b) by 315 days.

(21) Appl. No.: 13/518,819

(22) PCT Filed: Nov. 3, 2010

(86) PCT No.: PCT/CN2010/001759
§ 371 (c)(1),
(2), (4) Date: Mar. 6, 2013

(87) PCT Pub. No.: WO2012/024823
PCT Pub. Date: Mar. 1, 2012

(65) Prior Publication Data
US 2013/0156613 A1      Jun. 20, 2013

Related U.S. Application Data

(60) Provisional application No. 61/375,893, filed on Aug. 23, 2010.

(51) Int. Cl.
*F04B 53/20* (2006.01)
*F04B 39/16* (2006.01)
(Continued)

(52) U.S. Cl.
CPC ............... *F04B 39/16* (2013.01); *B60T 8/4031* (2013.01); *B60T 17/02* (2013.01); *B60T 17/04* (2013.01); *F04B 1/0452* (2013.01); *F04B 53/20* (2013.01)

(58) Field of Classification Search
CPC ..... B60T 8/368; B60T 8/4031; B60T 8/4068; B60T 8/4872; F04B 11/0091; F04B 53/20; F04B 53/166; F04B 53/168

USPC ........... 417/313, 470, 549, 554, 569; 91/422; 303/901
See application file for complete search history.

(56) References Cited

U.S. PATENT DOCUMENTS 5,232,273 A * 8/1993 Eckstein et al. ............ 303/116.4
6,146,115 A * 11/2000 Alaze .................... B60T 8/4031
417/415

(Continued)

FOREIGN PATENT DOCUMENTS

| CN | 10106896 A | 8/2007 |
|----|------------|--------|
| CN | 101016896 A | 8/2007 |

(Continued)

OTHER PUBLICATIONS

PCT International Search Report, 4 pages.
(Continued)

*Primary Examiner* — Patrick Hamo
(74) *Attorney, Agent, or Firm* — Dickinson Wright PLLC

(57) ABSTRACT

A piston pump assembly for pumping a fluid including a pump housing defining a bore. The pump housing further defines a fluid inlet and a fluid outlet and a fluid flow path extending therebetween for conveying the fluid from the fluid inlet to the fluid outlet. A piston is slidably disposed in the bore of the pump housing, and an eccentric engages the piston to propel the fluid through the fluid flow path. An inlet check valve and an outlet check valve body are disposed in the bore for only allowing the fluid to flow in one direction from the fluid inlet to the fluid outlet. A filter is disposed in the fluid flow path downstream of the inlet check valve and the outlet check valve body and adjacent to a damper orifice for filtering debris from the fluid before the fluid is conveyed to the fluid outlet.

24 Claims, 3 Drawing Sheets

(51) Int. Cl.
*B60T 17/02* (2006.01)
*B60T 17/04* (2006.01)
*F04B 1/04* (2006.01)
*B60T 8/40* (2006.01)

(56) References Cited

U.S. PATENT DOCUMENTS

| | | | |
|---|---|---|---|
| 6,334,762 B1 * | 1/2002 | Hauser et al. | 417/569 |
| 2007/0183911 A1 * | 8/2007 | Maeda et al. | 417/470 |
| 2008/0310971 A1 | 12/2008 | Harada | |

FOREIGN PATENT DOCUMENTS

| | | |
|---|---|---|
| CN | 101328871 A | 12/2008 |
| JP | 0874744 A | 3/1996 |
| JP | 2001107859 A | 4/2001 |
| JP | 2007218092 A | 8/2007 |
| JP | 2008111355 A | 5/2008 |

OTHER PUBLICATIONS

PCT Written Opinion, 4 pages.

* cited by examiner

HIGH PERFORMANCE ELECTRONIC STABILITY CONTROL PUMP ASSEMBLY

CROSS REFERENCE TO RELATED APPLICATIONS

This application claims priority to International Patent Application No. PCT/CN2010/001759 filed on Nov. 3, 2010, entitled "High Performance Electronic Stability Control Pump Assembly" and U.S. Provisional Application No. 61/375,893 filed on Aug. 23, 2010 entitled "High Performance Electronic Stability Control Pump Assembly".

BACKGROUND OF THE INVENTION

1. Field of the Invention

The invention relates to a piston pump assembly for pumping a fluid.

2. Description of the Prior Art

Piston pump assemblies are often used in electronic stability control braking systems of automobiles. One such piston pump assembly is shown in US Patent Application Publication No. 2007/0183911 to Maeda et al. (hereinafter referred to as Maeda '911). Maeda '911 shows such a pump assembly including a pump housing defining a bore extending along an axis. The pump housing further defines a fluid inlet for conveying the fluid into the bore and a fluid outlet spaced axially from the fluid inlet for dispensing the fluid out of the bore. A fluid flow path extends along the bore from the fluid inlet to the fluid outlet. The Maeda '911 pump assembly further includes a piston slidably disposed in the bore of the pump housing, and an eccentric engages and drives the piston to propel the fluid through the fluid flow path. The Maeda '911 pump includes two check valves for only allowing the fluid in the fluid flow path to flow in one direction from the fluid inlet to the fluid outlet. A filter is disposed in the bore of the pump housing between the two check valves for filtering debris from the fluid.

SUMMARY OF THE INVENTION AND ADVANTAGES

The subject invention is for such a pump assembly and wherein the filter is disposed in the fluid flow path downstream of each of the check valves. The positioning of the filter downstream of the check valves is advantageous because it eliminates the need for a pump inlet filter. Additionally, the filter is positioned to remove any debris that results from the manufacturing of the pump assembly, including any debris that is disposed on any of the check valves. Further, where the filter is positioned adjacent to a damper orifice, the filter can be made smaller and made more cheaply than the filters of the prior art pump assemblies.

The pump assembly may also include a sleeve of metal disposed in the bore of the pump housing. The sleeve has three different wall thicknesses; a thick wall for press fitting with the other components of the pump assembly, a medium wall for providing sufficient strength to support high pressure loads, and a thin wall to minimize the force required to punch orifices in the sleeve during the manufacturing process. The sleeve is preferably manufactured using a deep drawing manufacturing process to provide a smooth surface finish and very fast processing times while minimizing costs. In other words, the cold forming of the sleeve maximizes the utility of the sleeve while minimizing costs.

The entire piston of the pump assembly is preferably made of polyether ether ketone, or PEEK, with thirty percent (30%) carbon filler. The PEEK piston is extremely strong and durable and can survive even the most stringent durability requirements but costs and weighs less than the metal pistons of the prior art pump assemblies. Moreover, the PEEK piston provides very little dynamic friction when mated with a smooth, steel surface, e.g. a deep drawn metal sleeve. In other words, the PEEK composite piston is both cheaper and more efficient than the metal prior art pistons with no compromise in durability.

An o-ring is preferably disposed at one end of the sleeve to seal the sleeve to the piston and to the pump housing. In contrast to the pump assemblies of the prior art, the end of the sleeve is bent radially inwardly at a fifteen degree angle to aid in assembly of the sleeve and its mating piston while at the same time providing a surface sufficient to maintain the o-ring in its counterbore.

The pump assembly additionally includes an inlet check valve engaging the piston for only allowing the fluid to flow in one direction out of the piston. The inlet check valve includes a flat disc and a spring to bias the flat disc against the piston. This design of the inlet check valve minimizes the flow resistance of the fluid flowing out of the piston. Further, the disc is retained with a thin-walled, stamped steel retainer to provide improved flow performance when compared to the thicker walls of the plastic retainers of the prior art.

The pump assembly further includes a damper cup having a damper orifice for damping pressure pulsations in the fluid. The damper orifice size can be readily altered during the manufacturing process to accommodate any vehicle size or any application desired with a simple tool change.

The damper cup is preferably press-fit with an outlet check valve seat, and an outlet valve body and an outlet check valve spring disposed therebetween. This allows for pre-assembly and testing of these components. This is in contradistinction to the prior art pump assemblies, where such testing is not possible.

Lastly, a pump cap is disposed in the bore of the pump housing to seal the bore. The pump cap is preferably manufactured using a cold heading process and presents a flow divider having a plurality of divider channels to reduce noise levels of the fluid flowing through the fluid flow path from the fluid inlet to the fluid outlet. This flow divider design provides for a much quieter pump assembly in operation than the pump assemblies of the prior art. In summary, the pump assembly is more functional and cheaper to manufacture than the piston pumps of the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
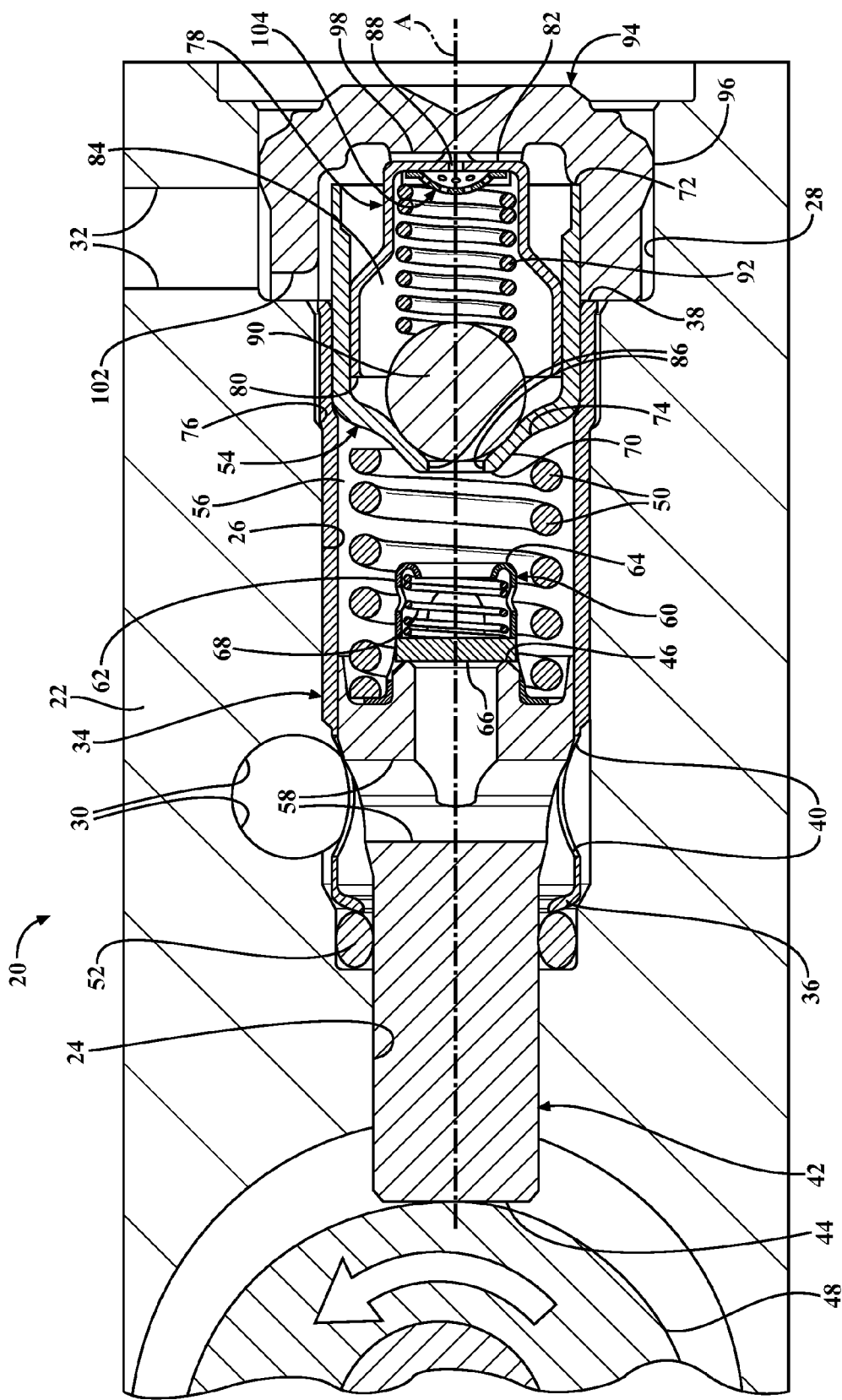
FIG. 1 is a cross-sectional view of the pump assembly of the exemplary embodiment.

Referring to the Figures, wherein like numerals indicate corresponding parts throughout the several views, a pump assembly 20 for pumping a fluid is generally shown in FIG. 1. The pump assembly 20 may be used to move fluids in many different applications, including electronic stability control and traction control systems for automobile brakes.

The pump assembly 20 includes a pump housing 22 defining a bore 24, 26, 28, generally indicated, extending along an axis A. The bore 24, 26, 28 of the pump housing 22 presents a first bore section 24 having a first diameter, a second bore section 26 having a second diameter greater than the first diameter, and a third bore section 28 having a third diameter greater than the second diameter. The pump housing 22 further defines a fluid inlet 30 for conveying the fluid into the bore 24, 26, 28 and a fluid outlet 32 spaced axially from the fluid inlet 30 for dispensing the fluid out of the bore 24, 26, 28. In the exemplary embodiment, the fluid inlet 30 is in fluid communication with the second bore section 26, and the fluid outlet 32 is in fluid communication with the third bore section 28. The pump housing 22 presents a fluid flow path extending through the bore 24, 26, 28 between the fluid inlet 30 and the fluid outlet 32. In operation, the fluid enters the pump assembly 20 at the fluid inlet 30, travels through the fluid flow path, and exits the pump assembly 20 through the fluid outlet 32.

The pump assembly 20 of the exemplary embodiment further includes a sleeve 34, generally indicated, having a tubular shape disposed in the second bore section 26 of the pump housing 22. The sleeve 34 extends axially from a first sleeve end 36 to a second sleeve end 38 and is press-fit into the second bore section 26 of the pump housing 22 to be in compression radially. The sleeve 34 further defines at least one sleeve orifice 40 radially aligned with the fluid inlet 30 for conveying the fluid in the fluid flow path from the fluid inlet 30 into the sleeve 34. The sleeve 34 of the exemplary embodiment includes a plurality of sleeve orifices 40. Preferably, the sleeve 34 is of metal and is manufactured through a deep drawing process to reduce manufacturing costs when compared to machining or other manufacturing processes. Additionally, the deep-drawing process provides the sleeve 34 with a very smooth surface finish to facilitate movement of a piston 42, as will be described in further detail below.

In the exemplary embodiment, the sleeve 34 includes at least three different material thicknesses including a low thickness area, a medium thickness area, and a high thickness area. The low thickness area is in the area of the sleeve orifices 40 to provide for easier manufacturing. Specifically, a lower force is required to punch the sleeve orifices 40 into the sleeve 34. The medium thickness area presents a clearance gap between the sleeve 34 and the second bore section 26 of the pump housing 22 for permitting precise inside diameter tolerance control for fitting with a slidable piston 42, discussed below, and maintaining sufficient strength to support pump pressure loads. The high thickness area of the sleeve provides for precise outside diameter tolerance control for a fluid-tight press fit with the second bore section 26 of the pump housing 22 and wherein the inside diameter is positioned in a non-critical area of the pump assembly 20 to allow for increased manufacturing tolerances and for allowing precise tolerance control for a fluid-tight press with an outlet check valve seat 54, as discussed below.

The pump assembly 20 additionally includes a piston 42, generally indicated, slidably disposed in the first and second bore sections 24, 26 of the pump housing 22 for propelling the fluid through the fluid flow path from the fluid inlet 30 to the fluid outlet 32. The piston 42 extends axially from a first piston end 44 to a second piston end 46 disposed in the sleeve 34. The piston 42 is preferably of polyether ether ketone, or PEEK, with approximately thirty percent (30%) carbon filler. This provides for a piston 42 with very high strength and durability. Additionally, the PEEK piston 42 has minimal dynamic friction when mated with the smooth metal surface of the deep drawn sleeve 34 of the exemplary embodiment.

An eccentric 48 is disposed adjacent to the first bore section 24 of the pump housing 22 and abutting the first piston end 44 of the piston 42 for driving the piston 42 in a first axial direction to define a delivery stroke of the piston 42. A piston return spring 50 is disposed in the second bore section 26 of the pump housing 22 and engaging the second piston end 46 of the piston 42 for biasing the piston 42 against the eccentric 48 to move the piston 42 in a second axial direction opposite of the first axial direction to define a return stroke of the piston 42 following the delivery stroke.

An o-ring 52, or any other type of seal, is disposed in the second bore section 26 of the pump housing 22 axially between the first sleeve end 36 and the pump housing 22 and radially between the piston 42 and the pump housing 22 for sealing the sleeve 34 to the pump housing 22 and to the piston 42. In the exemplary embodiment, the first sleeve end 36 extends at a fifteen degree angle relative to the second bore section 26 of the pump housing 22 to minimize the displacement of the o-ring 52 during the pumping of the piston 42.

An outlet check valve seat 54, generally indicated, is disposed in the second and third bore sections 26, 28 of the pump housing 22 and spaced axially from the piston 42 to define a first chamber 56 between the piston 42 and the outlet check valve seat 54. The piston return spring 50 extends between the outlet check valve seat 54 and the second piston end 46 of the piston 42.

The piston 42 defines a flow passage 58 for conveying the fluid along the fluid flow path from the plurality of sleeve orifices 40 to the first chamber 56 between the piston 42 and the outlet check valve seat 54. The flow passage 58 of the piston 42 of the exemplary embodiment receives the fluid from the sleeve orifices 40 in a radial direction and directs the fluid axially out the second piston end 46 of the piston 42 in an axial direction.

Figure 2:
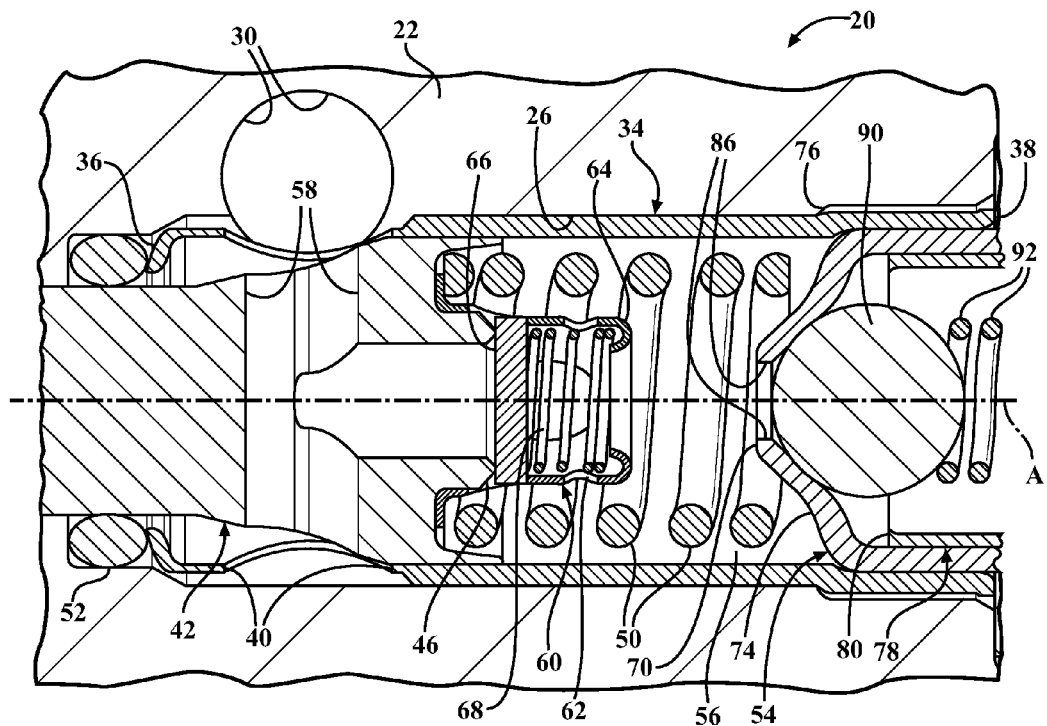
FIG. 2 is a view of the inlet check valve and the flow passage of the exemplary embodiment partially broken away and in cross-section.
Figure 3:
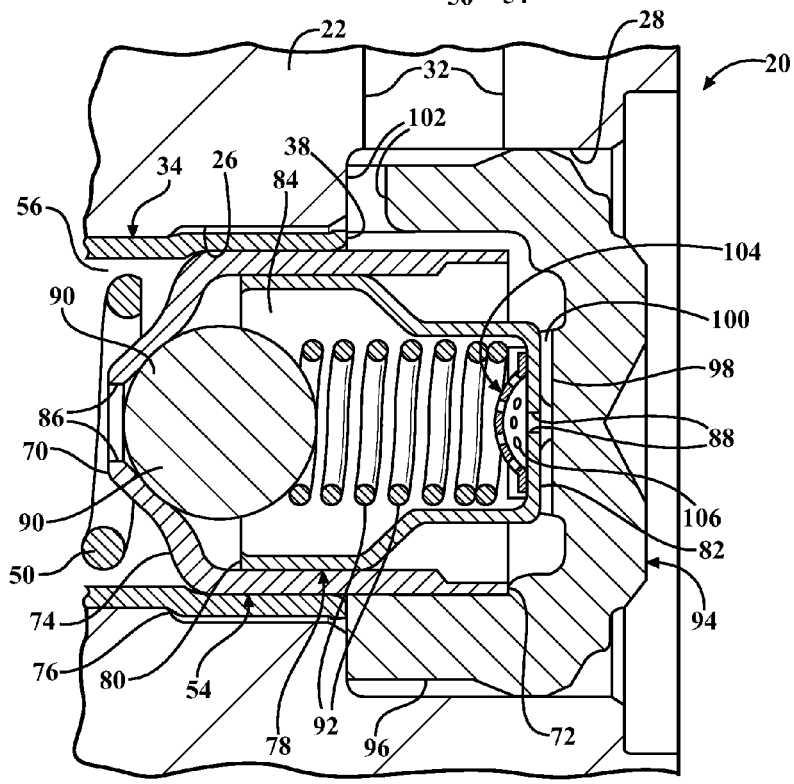
FIG. 3 is a view of the damper cup and the filter and the outlet check valve seat and the outlet valve body and the outlet check valve spring and the pump cap of the exemplary embodiment partially broken away and in cross-section.
Figure 4:
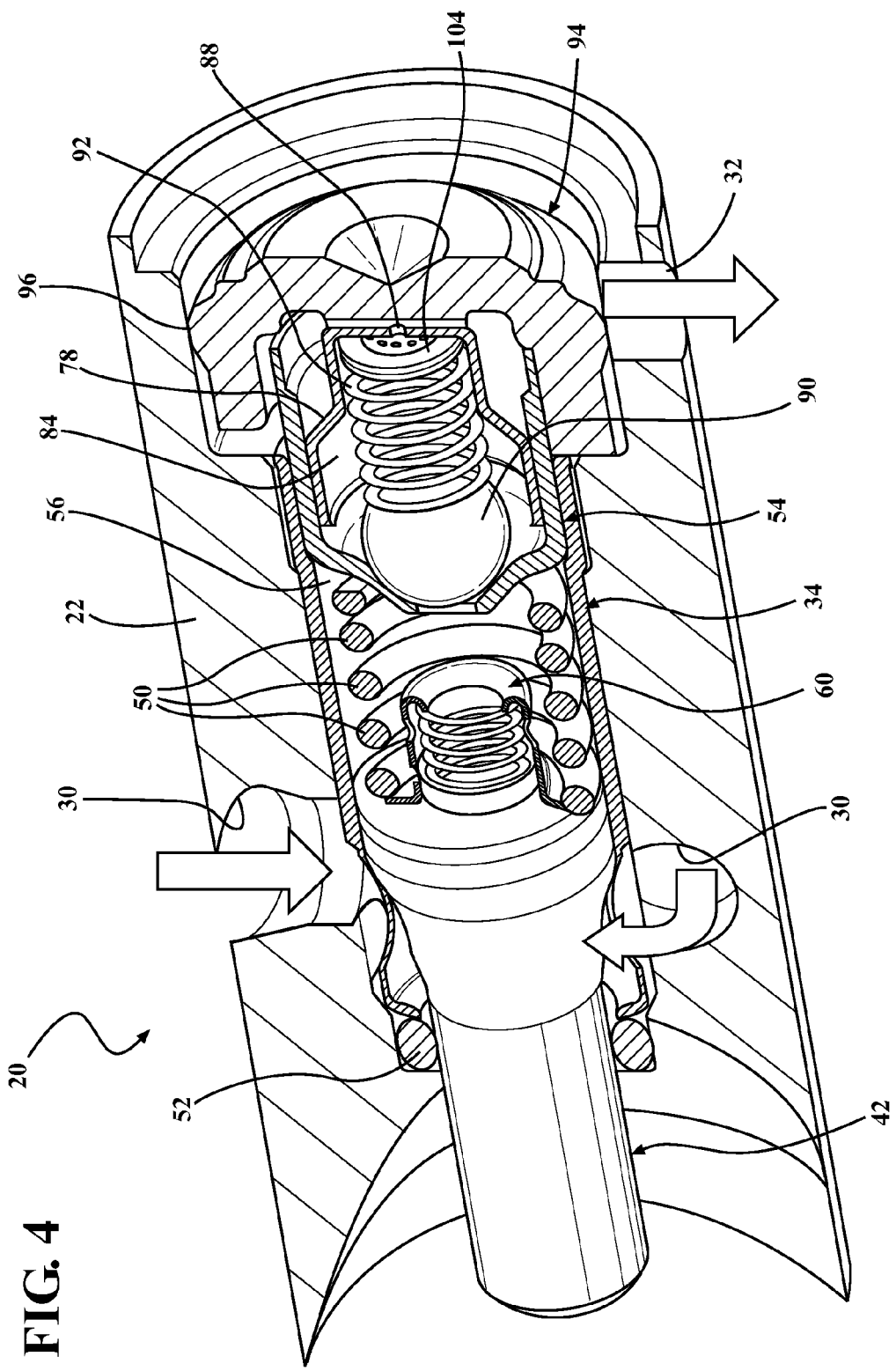
FIG. 4 is a fragmentary view of the pump assembly of the exemplary embodiment.

An inlet check valve 60, generally indicated and best shown in FIG. 2, is disposed in the first chamber 56 and engages the second piston end 46 of the piston 42 for allowing the fluid in the fluid flow path to flow only in one direction out of the flow passage 58 of the piston 42 and into the first chamber 56. The inlet check valve 60 includes a spring retainer 62 defining an inlet valve spring seat 64 spaced axially from the second piston end 46 of the piston 42. The spring retainer 62 extends axially from the inlet valve spring seat 64 to the second piston end 46. The spring retainer 62 is preferably of steel and is manufactured using a stamping process. The inlet check valve 60 further includes a flat disc 66 disposed between the second piston end 46 and the inlet valve spring seat 64 of the spring retainer 62. An inlet check valve spring 68 extends between the inlet valve spring seat 64 of the spring retainer 62 and the flat disc 66 for biasing the flat disc 66 against the second piston end 46. The biased flat disc 66 only allows the fluid in the fluid flow path to flow out of the flow passage 58 of the piston 42 and into the first chamber 56 in response to the pressure of the fluid in the flow passage 58 exceeding the pressure of the fluid in the first chamber 56 by a predetermined magnitude during the return stroke of the piston 42, as will be discussed in further detail below.

The outlet check valve seat 54 extends from a first valve seat end 70 disposed axially within the sleeve 34 in the second bore section 26 to a second valve seat end 72 disposed in the third bore section 28. The first valve seat end 70 extends radially inwardly and axially toward the piston 42 to define a piston return spring seat 74 for positioning the piston return spring 50 in the first chamber 56. The outlet check valve seat 54 is preferably of metal and is preferably manufactured using a deep drawing process. The outlet check valve seat 54 of the exemplary embodiment is press-fit into the sleeve 34, and the sleeve 34 presents an internal step 76 to prevent the outlet check valve seat 54 from moving axially under high pressure loading.

A damper cup 78, generally indicated, is disposed in the bore 24, 26, 28 of the pump housing 22 and extends axially from a first damper cup end 80 to a second damper cup end 82. The first damper cup end 80 is press-fit into the outlet check valve seat 54 to present a second chamber 84 between the first valve seat end 70 of the outlet check valve seat 54 and the second damper cup end 82 of the damper cup 78. The press-fit connection between the damper cup 78 and the outlet check valve seat 54 allows for pre-assembly and testing of these components before they are installed in the pump housing 20.

The first valve seat end 70 of the outlet check valve seat 54 defines an outlet valve seat orifice 86 for conveying the fluid in the fluid flow path from the first chamber 56 to the second chamber 84, and the second damper cup end 82 presents a damper orifice 88 conveying the fluid in the fluid flow path out of the second chamber 84. The damper orifice 88 is sized to damp pressure pulsations in the fluid.

An outlet valve body 90 is disposed between the outlet check valve seat 54 and the damper cup 78. An outlet check valve spring 92 extends between the outlet valve body 90 and the damper cup 78 for biasing the outlet valve body 90 against the first valve seat end 70 of the outlet check valve seat 54 and for allowing the fluid to flow through the outlet valve seat orifice 86 only in response to the pressure of the fluid in the first chamber 56 exceeding the pressure of the fluid in the second chamber 84 by a predetermined magnitude during the delivery stroke of the piston 42, as will be discussed in further detail below.

A pump cap 94, generally indicated, having a cup shape is disposed in the third bore section 28 of the pump housing 22. The pump cap 94 is preferably manufactured using a cold heading manufacturing process but could be made using any other manufacturing process. In the exemplary embodiment, the pump cap 94 has an outer surface 96 that is press-fit into the third bore section 28 of the pump housing 22 to seal the bore 24, 26, 28 of the pump housing 22, and the pump cap 94 has an inner surface that is press-fit about the outlet check valve seat 54.

In the exemplary embodiment, the pump cap 94 defines a flow divider 98 engaging the second damper cup end 82 and defining a pair of flow divider channels 100 extending perpendicularly to one another for conveying the fluid in the fluid flow path from the damper orifice 88 radially outwardly between the pump cap 94 and the damper cup 78. Further, the pump cap 94 of the exemplary embodiment presents a plurality of escape channels 102 for conveying the fluid in the fluid flow path between the pump cap 94 and the damper cup 78 to the fluid outlet 32 of the pump housing 22. The design of the pump cap 94 with the flow divider channels 100 and the escape channels 102 minimizes the noise produced by the fluid flowing in the fluid flow path from the fluid inlet 30 to the fluid outlet 32.

A filter 104, generally indicated, presenting a plurality of filter orifices 106 is disposed in the fluid flow path downstream of each of the check valves 60, 90 for filtering debris from the fluid before the fluid is conveyed to the fluid outlet 32 of the pump housing 22. In the exemplary embodiment, the filter 104 is disposed in the second chamber 84 between the outlet check valve seat 54 and the damper cup 78 and adjacent to the damper orifice 88. The filter 104 is preferably of steel and manufactured using a stamping process. The position of the filter 104 downstream of the check valves 60, 90 eliminates the need for a pump inlet filter. Further, because the filter 104 is disposed adjacent to the relatively small damper orifice 88, the filter 104 can be made smaller, and thus more cheaply, than a comparable pump inlet filter would require. Additionally, the location of the filter 104 allows the filter 104 to pick up any debris resulting from the manufacturing of the pump assembly 20, including any debris that might have been disposed on either of the check valves 60, 90.

In operation, when the eccentric 48 spins, it first drives the piston 42 in the first axial direction during the delivery stroke. The piston 42 compresses the fluid in the first chamber 56 of the fluid flow path, thereby overcoming the biasing force on the outlet valve body 90 by the outlet check valve spring 92 to allow the fluid to flow from the first chamber 56 into the second chamber 84. Some of the fluid in the second chamber 84 is then forced through the filter orifices 106 and through the damper orifice 88, which dampens the pressure pulsations in the fluid flowing through the fluid flow path. Upon exiting the damper orifice 88, the fluid is guided through the flow divider channels 100 of the flow divider 98 of the pump cap 94 and through the escape channels 102 of the pump cap 94 to the fluid outlet 32 of the pump housing 22. Following the delivery stroke of the piston 42, the piston return spring 50 urges the piston 42 in the second axial direction opposite of the first axial direction. This increases the volume of the first chamber 56, thereby decreasing the pressure of the fluid in the first chamber 56. Concurrently, the pressure of the fluid in the flow passage 58 of the piston 42 remains relatively constant. Once the pressure of the fluid in the flow passage 58 of the piston 42 exceeds the pressure of the fluid in the first chamber 56 by a predetermined magnitude, the flat disc 66 is urged away from the second piston end 46 to allow the fluid to flow from the flow passage 58 of the piston 42 into the first chamber 56. In other words, when the pressure in the first chamber 56 decreases by a predetermined amount relative to the pressure of the fluid in the flow passage 58, the inlet check valve 60 opens up to allow fluid to flow therethrough. This process is then repeated with every turn of the eccentric 48.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pump assembly for pumping a fluid comprising:
a pump housing defining a bore extending along an axis and defining a fluid inlet for conveying the fluid into said bore and defining a fluid outlet spaced axially from said fluid inlet for dispensing the fluid out of said bore and presenting a fluid flow path extending from said fluid inlet to said fluid outlet,
a piston slidably disposed in said bore of said pump housing for propelling the fluid through said fluid flow path,
an eccentric engaging said piston for driving said piston to propel the fluid through said fluid flow path,
a plurality of check valves disposed in said fluid flow path for only allowing the fluid in said fluid flow path to flow in one direction from said fluid inlet to said fluid outlet, a filter disposed in said bore of said pump housing and defining at least one filter orifice for filtering debris from the fluid before the fluid is conveyed to said fluid outlet of said pump housing, and said filter being disposed in said fluid flow path downstream of each of said least one check valves.

2. The assembly as set forth in claim 1 wherein said filter includes a plurality of filter orifices.

3. The assembly as set forth in claim 1 further including a damper disposed in said fluid flow path of said bore of said pump housing downstream of said plurality of check valves and including a damper orifice for damping pressure pulsations in the fluid.

4. The assembly as set forth in claim 3 wherein said filter engages said damper downstream of said plurality of check valves.

5. The assembly as set forth in claim 1 wherein said pump housing presents a first bore section having a first diameter and a second bore section having a second diameter greater than said first diameter and a third bore section having a third diameter greater than said second diameter.

6. The assembly as set forth in claim 5 wherein said fluid inlet is in fluid communication with said second bore section and said fluid outlet is in fluid communication with said third bore section.

7. The assembly as set forth in claim 6 further including a sleeve press-fit into said second bore section of said pump housing.

8. The assembly as set forth in claim 7 wherein said sleeve defines at least one sleeve orifice axially aligned with said fluid inlet for conveying the fluid in said fluid flow path from said fluid inlet into said sleeve.

9. The assembly set forth in claim 8 wherein said sleeve has at least three different material thicknesses.

10. The assembly set forth in claim 9 wherein said sleeve includes a low thickness area around said at least one sleeve orifice for ease of manufacture.

11. The assembly set forth in claim 10 wherein said sleeve includes a medium thickness area to present a clearance gap between said sleeve and said second bore section of said pump housing.

12. The assembly set forth in claim 11 wherein said sleeve includes a high thickness area for a fluid-tight press fit with said second bore section of said pump housing and wherein an inside diameter of said sleeve is positioned in said pump assembly to allow for increased manufacturing tolerances and for allowing a fluid-tight press with an outlet check valve seat.

13. A pump assembly for pumping a fluid comprising:
a pump housing defining a bore extending along an axis and defining a fluid inlet for conveying the fluid into said bore and defining a fluid outlet spaced axially from said fluid inlet for dispensing the fluid out of said bore and presenting a fluid flow path extending from said fluid inlet to said fluid outlet,
a piston slidably disposed in said bore of said pump housing for propelling the fluid through said fluid flow path,
an eccentric engaging said piston for driving said piston to propel the fluid through said fluid flow path,
at least one check valve disposed in said fluid flow path for only allowing the fluid in said fluid flow path to flow in one direction from said fluid inlet to said fluid outlet,
a filter disposed in said bore of said pump housing and defining at least one filter orifice for filtering debris from the fluid before the fluid is conveyed to said fluid outlet of said pump housing,
said filter being disposed in said fluid flow path downstream of said at least one check valve,
wherein said pump housing presents a first bore section having a first diameter and a second bore section having a second diameter greater than said first diameter and a third bore section having a third diameter greater than said second diameter,
wherein said fluid inlet is in fluid communication with said second bore section and said fluid outlet is in fluid communication with said third bore section,
a sleeve press-fit into said second bore section of said pump housing, and
wherein one end of said sleeve is bent radially inwardly at a 15 degree angle to facilitate ease of assembly of said slidable piston and to facilitate forming a seal with said bore of said pump housing and an o-ring in said bore.

14. The assembly as set forth in claim 1 wherein said piston defines a flow passage for conveying the fluid from the fluid inlet along the fluid flow path.

15. The assembly as set forth in claim 14 wherein said piston is of a polyether ether ketone material.

16. The assembly as set forth in claim 14 further including an inlet check valve engaging said piston for conveying the fluid in said fluid flow path only out of said flow passage of said piston and into said bore of said pump housing.

17. The assembly as set forth in claim 16 wherein said inlet check valve includes a spring retainer defining an inlet valve spring seat spaced axially from said piston and includes a flat disc disposed between said piston and said inlet valve spring seat and includes an inlet check valve spring extending between said inlet valve spring seat of said spring retainer and said flat disc for biasing said flat disc against said piston to allow the fluid in said fluid flow path to flow out of said flow passage of said piston and into said bore only in response to the pressure of the fluid in said flow passage exceeding the pressure of the fluid in said bore by a predetermined magnitude.

18. The assembly as set forth in claim 17 further including an outlet check valve seat spaced axially from said piston in said bore of said pump housing for defining a first chamber between said piston and said outlet check valve seat.

19. The assembly as set forth in claim 18 further including a piston return spring disposed in said first chamber and extending between said outlet check valve seat and said piston for biasing said piston against the eccentric.

20. The assembly as set forth in claim 19 further including a damper cup disposed in said bore of said pump housing and spaced axially from said outlet check valve seat to define a second chamber between said outlet check valve seat and said damper cup.

21. The assembly as set forth in claim 20 wherein said outlet valve seat defines an outlet valve seat orifice for conveying the fluid from said first chamber to said second chamber.

22. The assembly as set forth in claim 21 further including an outlet valve body disposed in said second chamber.

23. The assembly as set forth in claim 22 further including an outlet check valve spring extending between said outlet valve body and said damper cup for biasing said outlet valve body against said outlet check valve seat to only allow the fluid to flow through the outlet valve seat in the direction from said first chamber to said second chamber.

24. The assembly as set forth in claim 23 wherein said outlet valve body has a spherical shape.

* * * * *